United States Patent [19]

Kolar

[11] 4,185,544

[45] Jan. 29, 1980

[54] PISTON FOR COMBUSTION ENGINES

[75] Inventor: Frantisek Kolar, Stuttgart, Fed. Rep. of Germany

[73] Assignee: Mahle GmbH, Stuttgart, Fed. Rep. of Germany

[21] Appl. No.: 834,212

[22] Filed: Sep. 19, 1977

[30] Foreign Application Priority Data

Oct. 20, 1976 [DE] Fed. Rep. of Germany ....... 2647250

[51] Int. Cl.[2] .................................................. F16J 1/00

[52] U.S. Cl. ....................................... 92/220; 403/124

[58] Field of Search ................. 92/220, 221, 187, 191, 92/255, 258; 123/193 P; 403/124, 126

[56] References Cited

U.S. PATENT DOCUMENTS

| | | | |
|---|---|---|---|
| 1,866,057 | 7/1932 | Reid | 92/187 X |
| 3,401,962 | 9/1968 | Scheublein et al. | 403/126 |
| 3,915,141 | 10/1975 | Ottl et al. | 123/193 P |

FOREIGN PATENT DOCUMENTS

| | | | |
|---|---|---|---|
| 518857 | 3/1940 | United Kingdom | 403/124 |
| 518861 | 3/1940 | United Kingdom | 403/124 |

*Primary Examiner*—Irwin C. Cohen
*Attorney, Agent, or Firm*—Robert B. Murray

[57] ABSTRACT

A piston comprising a lower part with a bore having a concave surface against which abuts the convex surface of a head of an expansion socket, the center of curvature of the concave surface lying on the axis of the bore and the head being formed in two halves with each half having a center of curvature lying offset from the axis of the bore.

3 Claims, 1 Drawing Figure

15
3
7
8
6
9
A
5
11
12
10
14
13
R2
R1
M2
M1
1
4
2
3

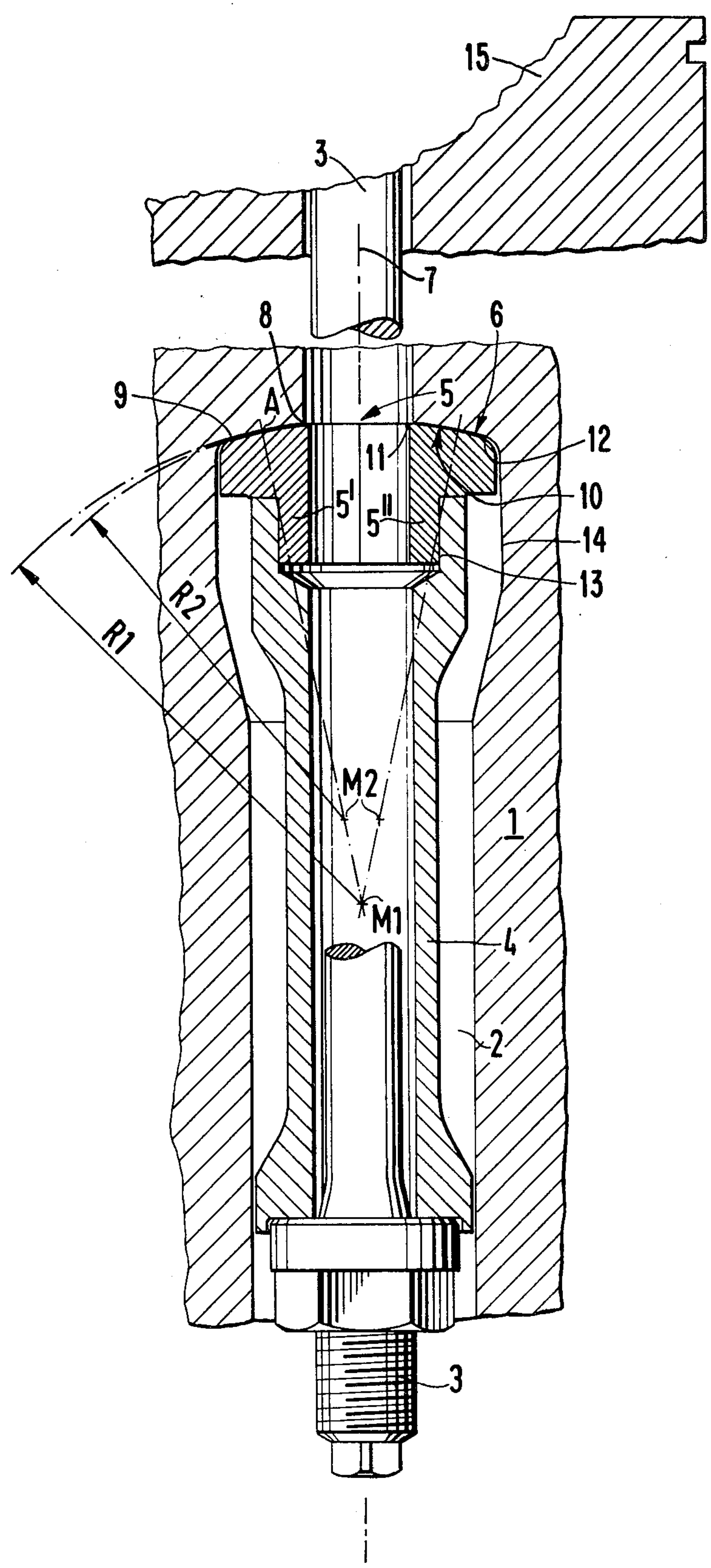
15
3
7
8
6
9
A
5
11
12
5'
5''
10
14
13
R2
R1
M2
M1
1
4
2
3

PISTON FOR COMBUSTION ENGINES

BACKGROUND TO THE INVENTION

1. Field of the Invention

The invention relates to a piston for combustion engines, with a lower part surrounding the shaft zone and with an upper part connected with the said lower part via expansion screws and forming the base and the ring zone, the expansion screws in the lower part resting on expansion sockets engaging respective borings in the lower part of the piston, while the supporting action between the expansion socket and the lower part of the piston is provided via a convex surface on the said expansion socket and a correspondingly concave surface on the lower part of the piston, the radius of the convex surface being smaller than that of the corresponding concave surface.

The expansion sockets are used for the purpose of imparting a certain prestressing to the screws, this being required in order to ensure a reliable connection between the upper and the lower part of the piston in operation.

2. Description of the Prior Art

In the constructions hitherto in use the central points of the radii of the convex and concave bearing surfaces were in each case both situated on the axis of the screw holes in the lower part of the piston. The radii are made different in the manner mentioned in order to ensure that when the screws are tightened up, in the outer zone of the bearing surface of the lower part of the piston, the expansion socket will not be overstrained. For it has been found in practice that in many cases this zone is in danger of developing cracks. Such overstraining was particularly liable to occur when the bearing surfaces on the expansion socket and lower part of the piston were still made flat. When the bearing surfaces are made flat it is impossible, for reasons connected with manufacturing accuracy, for an even supporting action to be obtained over the entire surface. On the contrary, it is certain which zones of the bearing surfaces will be subjected to extra strain. The adoption of convex-concave bearing surfaces, in which the radius of curvature for the expansion socket bearing action is smaller than the radius of curvature for the lower part of the piston, ensures that the expansion socket will first of all be supported in the inner edge zone of the boring, contact over the entire surface being deferred until the screw is tightened up. This prevents the outer zone of the bearing surface of the lower part, the zone exposed to the danger of cracking, from being subjected to an overload conducive to the formation of such cracks.

In this version, however, the internal zone of the boring, i.e. the inner edge of the bearing surface for the expansion socket, in the lower part of the piston, may in certain cases suffer excessive strain.

SUMMARY OF THE INVENTION

In order to eliminate this risk the invention proposes that the central point of the radius of curvature of the annular convex bearing surface of the expansion socket should be positioned, in contradistinction to the central point of the concave corresponding surface of the lower part of the piston, in the vicinity of the longitudinal axis of the said socket.

The first contact between the expansion socket and the lower part of the piston will thus occur in the central zone, as viewed in the radial direction, of the bearing surface between the said expansion socket and the said lower part. When the screw is tightened up the bearing surfaces resting against one another are then brought into complete contact, starting from an initial middle line of contact. In this version neither the inner nor the outer bearing surface can be overstrained. In particular, the inner edge of the boring cannot suffer plastic deformation or displacement, as was possible in the present construction for the bearing system.

A bearing surface of a given size can only absorb a certain bearing force from the material of the lower part of the piston. Higher screw thrusts would cause damage to the bearing surface during the operation of the piston. Since in certain cases, however, higher screw thrusts have to be applied than the bearing surface of a boring of constant diameter in the lower part would allow, the invention proposes yet a further improvement for the bearing surface of the expansion socket.

This resides in the fact that the expansion socket is provided, on the side facing towards the bearing surface, with a detachable head of which the periphery can be subdivided. This makes it possible for the boring in the lower part of the piston to be widened simply in the zone of the bearing surface of the expansion socket and to be given a smaller diameter in the remaining zone. This is of importance inasmuch as the lower zone of the lower part of the piston, through which zone the boring extends, frequently has no room for a larger boring. The provision of a separate divisible head in the bearing zone of the expansion socket enables the head in the divided state to be introduced through the narrow boring, after which, in the bearing zone, it can be laid against the expansion socket, when the latter is being mounted, in such a way that a larger bearing surface can be obtained than in the case of the lower zone of the boring.

BRIEF DESCRIPTION OF THE DRAWING

The drawing shows a partial view, mainly in cross-section, of a piston according to the present invention.

DESCRIPTION OF PREFERRED EMBODIMENT

In a boring 2 in the lower part 1 of the piston, an expansion screw 3 connecting the lower part 1 to the upper part 15 rests against the said boring via an expansion socket 4. The boring 2 in the lower part 1 of the piston has a longitudinal axis 7, and is provided with a concave supporting surface 6 having radially inner and outer limits 8 and 9 respectively and a radius of curvature $R_1$, the centre $M_1$ of which lies on the longitudinal axis 7. The expansion socket 4 is provided with a convex supporting surface 10, having radially inner and outer limits 11 and 12 respectively and a radius of curvature $R_2$, the centre $M_2$ of which lies to one side of the longitudinal axis 7.

The position of the centre $M_2$ is so chosen that the point A of contact between the contact surfaces occurs outside the radially inner limits 8, 11. The radius $R_2$ is less than the radius $R_1$, so that the point A occurs inside the radially outer limits 9, 12 of the contact surfaces. Starting from the point of contact A, the bearing surface makes contact over the entire surface, towards both sides, when the expansion screw 3 is tightened up, in which latter process the overstraining of the outer or inner zone of the bearing surface is completely avoided.

In the example shown the expansion socket 4 is provided with a head 5 consisting of two halves 5' and 5'', on which the contact surface 10 is formed. This head 5 is held by the expansion socket 4 in a cylindrical guide 13. The boring in the lower part of the piston includes a widened portion 14 in the bearing zone of the expansion socket. The expansion socket is mounted by first of all introducing the individual parts of the head 5' and 5" separately into the boring and then connecting them to the expansion socket.

I claim:

1. In a piston having an upper piston part and a lower piston part connected together by an expansion screw, the provision of:

a boring in said lower piston part;

an expansion socket in said boring, said expansion screw extending through and resting on said expansion socket;

a concave supporting surface formed in said boring, having its centre of radius of curvature positioned on the longitudinal axis of said boring, and having radially inner and outer limits;

a multi-part head portion detachably formed on said expansion socket, and a convex supporting surface formed on said head portion, having a radius of curvature less than the radius of curvature of said concave surface, having its centre of radius of curvature positioned outside said longitudinal axis and having radially outer and inner limits, the arrangement being such that tangential contact between said convex and concave surfaces occurs intermediate said radially inner limits of said concave and convex surfaces and said radially outer limits of said concave and convex surfaces.

2. In a piston according to claim 1, a cylindrical guide formed on said expansion socket; and said multi part head portion comprises a two-part head portion removably received in said cylindrical guide.

3. In a piston according to claim 2, said boring in the lower piston part including a widened portion adjacent said concave surface.

* * * * *